May 3, 1960  E. WILDHABER  2,934,977
INDEXING MECHANISM
Filed April 12, 1955  6 Sheets-Sheet 2
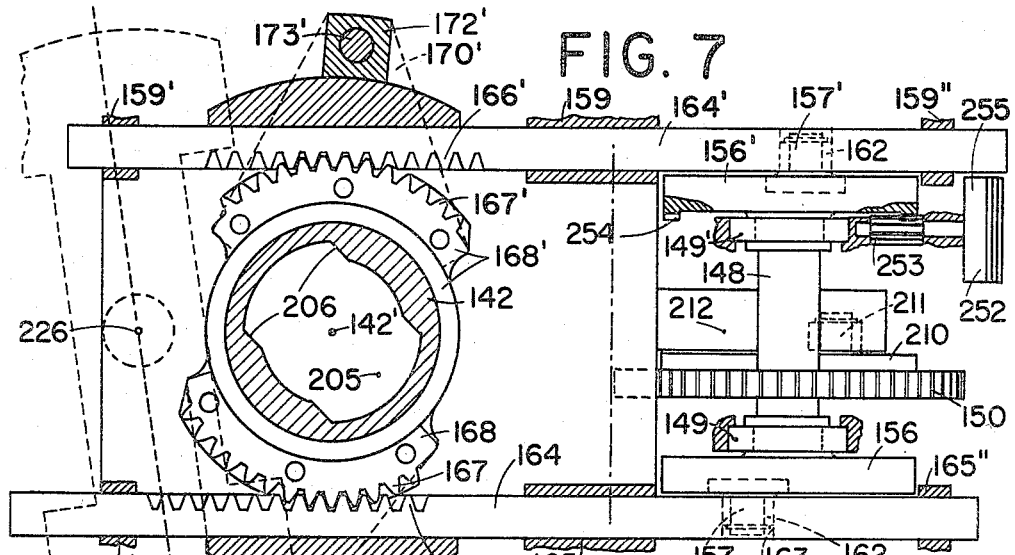
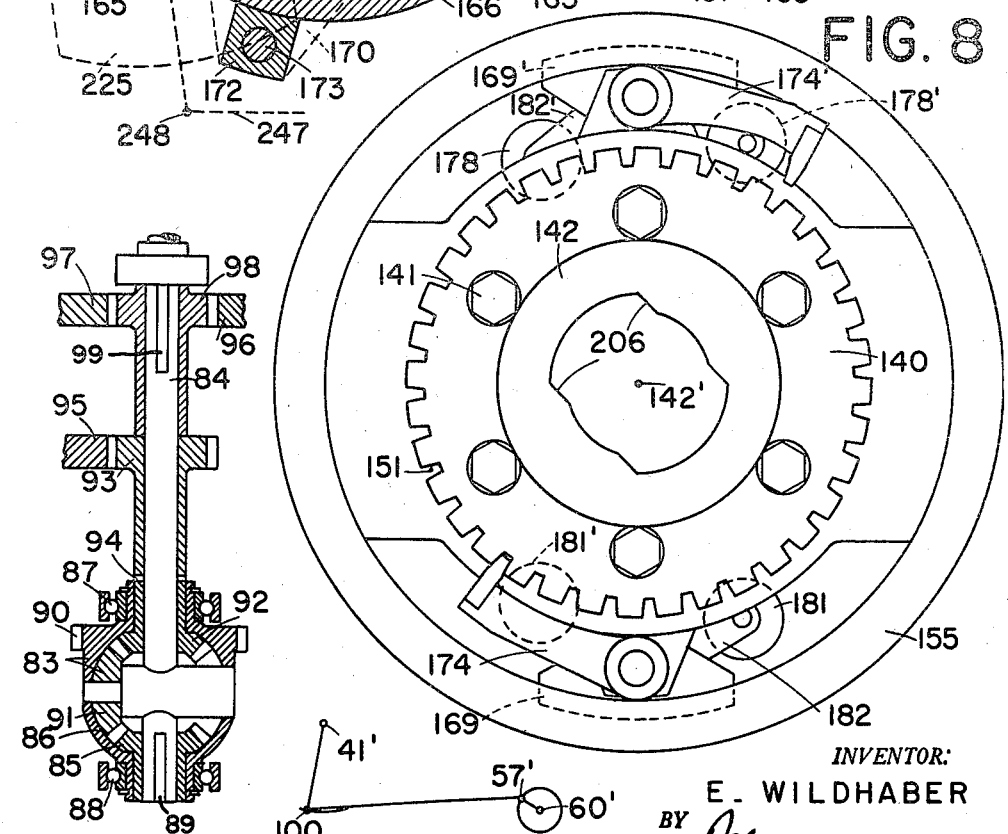
INVENTOR:
E. WILDHABER
BY
Attorney

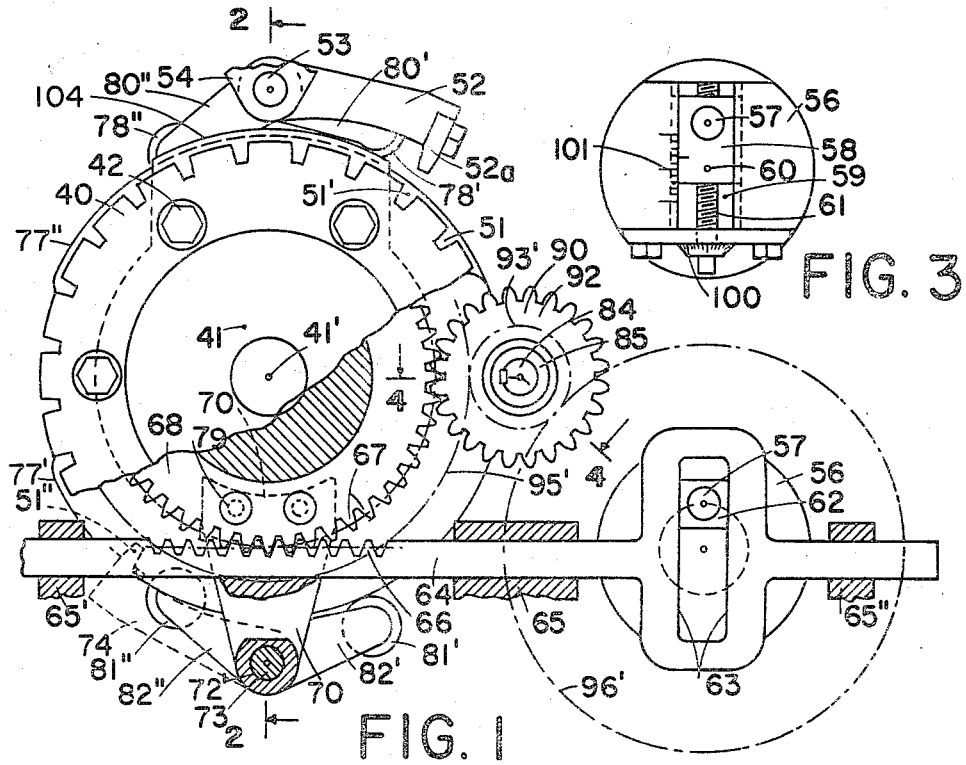

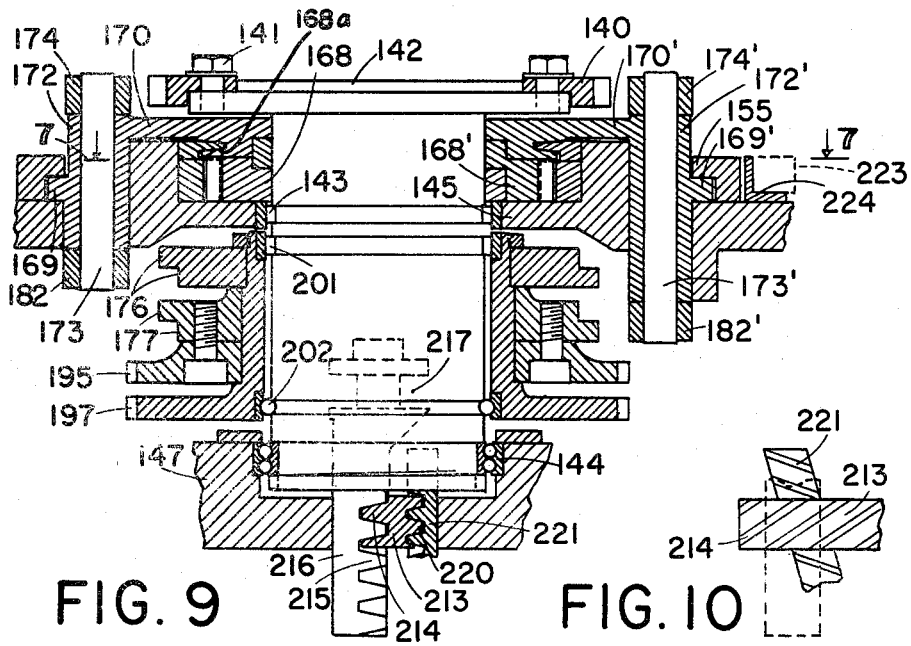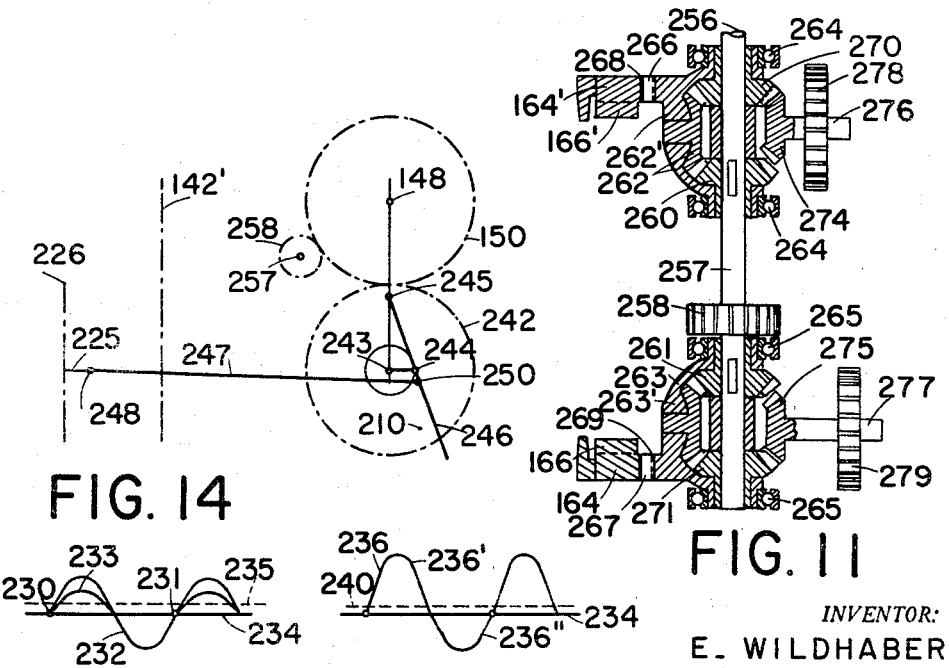

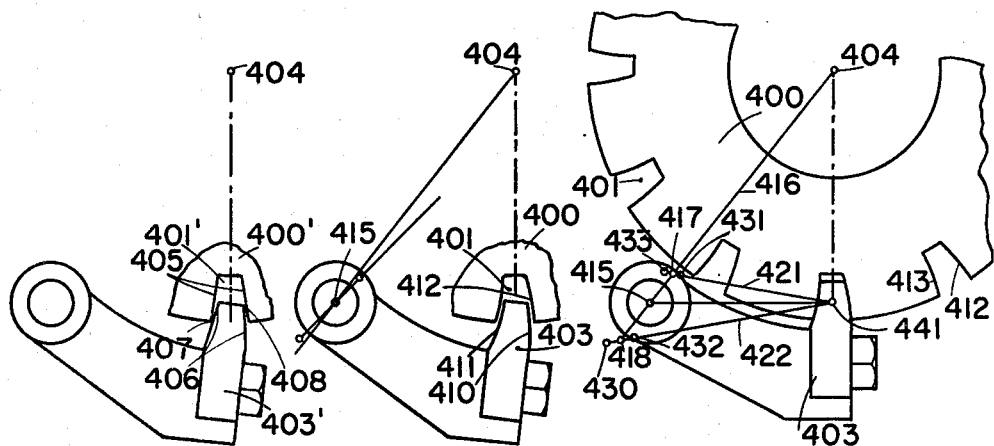
FIG.18  FIG.19  FIG.20
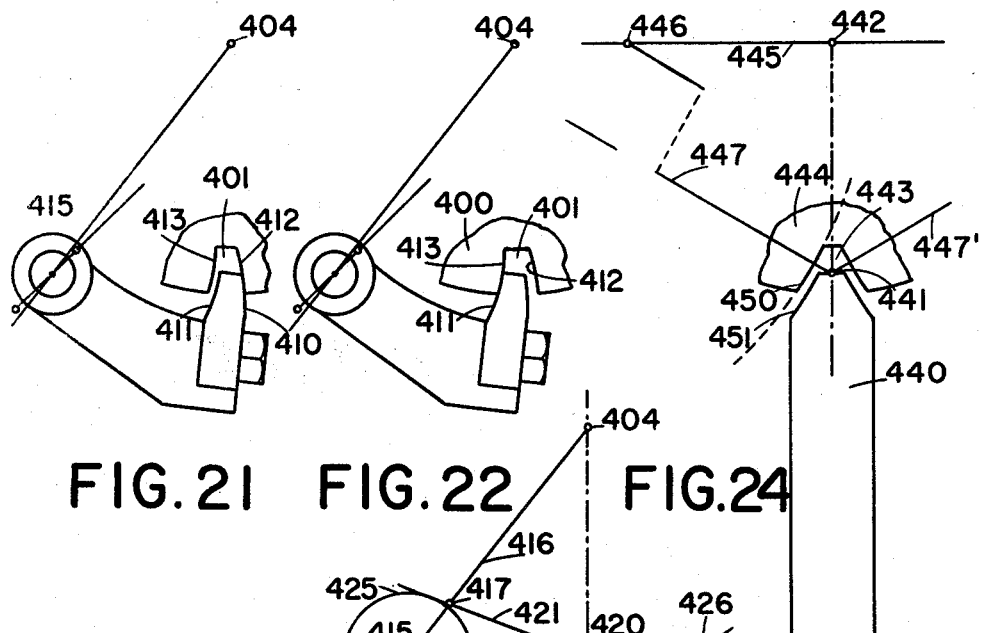
FIG.21  FIG.22  FIG.24
FIG.23
INVENTOR:
E. WILDHABER
BY
Attorney May 3, 1960     E. WILDHABER     2,934,977
INDEXING MECHANISM Filed April 12, 1955     6 Sheets-Sheet 6

INVENTOR:
E. WILDHABER
BY
Attorney

United States Patent Office 2,934,977
Patented May 3, 1960

2,934,977

INDEXING MECHANISM

Ernest Wildhaber, Rochester, N.Y.

Application April 12, 1955, Serial No. 500,933

17 Claims. (Cl. 74—822)

The present invention relates to indexing mechanisms, and especially to indexing mechanisms such as are used in gear-producing machines, and on other machines for producing articles having a plurality of identical projections or grooves. The invention has application, however, also to indexing mechanism for the turrets of machine tools, and in many other places. More specifically, the invention relates to an indexing mechanism which, in the indexing operation, speeds up the body being indexed gradually and slows it down gradually, without sudden impacts or clashes.

One object of the present invention is to provide an improved index mechanism of the character described where the indexing motion is derived from an adjustable crank pin, and where the indexing motion itself can be adjusted for different numbers of teeth or grooves in the work.

Another object of the invention is to provide an index mechanism of the plate type with controlled acceleration and deceleration, in which a single adjustment, aside from change of the index plate, is sufficient for setting the index mechanism to index for a different tooth number.

Another object of the invention is to provide a simple and reliable indexing mechanism that is adjustable for a wide range of tooth numbers.

Another object of the invention is to provide a notched-plate type index mechanism, in which the index plate is employed for two purposes, namely, for securing the work, and for applying the indexing motion.

Another object of the invention is to provide a practical index mechanism for an oscillating device.

Another object of the invention is to provide an index mechanism with mass balance, and more particularly an index mechanism in which mass balance is attained by a body which oscillates between the same two positions on successive indexing cycles.

A related object of the invention is to provide a mass-balanced index mechanism, in which the torque variations due to the changes in kinetic energy are mitigated or eliminated. To this end, it is a further purpose of the invention to provide a mass-balanced index mechanism containing an inertia member adapted to periodically store up and deliver most of the kinetic energy of the indexed parts.

Another object of the invention is to provide a plate type index mechanism having an improved form of index plate and improved pawls or locking dogs for cooperating therewith.

A further object of the invention is to provide a plate type index mechanism which may be locked up in a plurality of places simultaneously, thereby to minimize wear and further assist in achieving mass balance.

Other objects of the invention will be apparent hereinafter from the specification and from the recital of the appended claims.

In the drawings:

Fig. 1 is a part view, part section, taken on the line 1—1 of Fig. 2, looking in the direction of the arrows, and showing an index mechanism constructed according to one embodiment of this invention;

Fig. 2 is a section taken on the line 2—2 of Fig. 1, looking in the direction of the arrows;

Fig. 3 is a detailed view showing the face plate with adjustable crank pin used in the embodiment of the invention shown in Figs. 1 and 2;

Fig. 4 is a section on the line 4—4 of Fig. 1, looking in the direction of the arrows;

Fig. 5 is a fragmentary axial section of an index plate unit such as may be used in this indexing mechanism for large, even tooth numbers;

Fig. 6 is a diagram explanatory of a slightly modified embodiment of the invention;

Fig. 7 is a part view, part section, taken on the line 7—7 of Fig. 9, looking in the direction of the arrows, and illustrating a further embodiment of the invention;

Fig. 8 is an elevation of the index plate and associated parts of the mechanism shown in Fig. 7;

Fig. 9 is an axial section of this embodiment of the invention, taken in a vertical plane in Fig. 8;

Fig. 10 is a fragmentary detail of part of the intermeshing gearing shown in Fig. 9;

Fig. 11 is an axial section taken along the axis of the drive shaft in a vertical plane in Fig. 7, and showing the differentials used in the cam drives;

Figs. 12 and 13 are diagrams explanatory of the principles underlying the dynamic balance of the inertia moments in accordance with the present invention;

Fig. 14 is a diagram explanatory of the linkage for rocking the mass balance member;

Fig. 18 is a fragmentary view showing how a conventional locking dog moves out of or into a notch of a conventional index plate;

Fig. 19 is a similar view but showing a notch of an index plate constructed in accordance with one embodiment of the present invention and a locking dog, adapted to cooperate with this index plate;

Fig. 20 is a fragmentary view of this index plate and locking dog, showing the dog in full depth engagement with the index plate;

Figs. 21 and 22 are views, similar to Fig. 19, but showing the index plate turned on its axis from the position of Fig. 19 through slight angles so that the locking dog contacts opposite sides, respectively, of a notch of the index plate;

Fig. 23 is a diagram explanatory of the general determination of the shape of a notch of the index plate;

Fig. 24 is a fragmentary view of an index plate constructed in accordance with a still further embodiment of the invention and of a radially movable locking dog adapted to cooperate with that plate;

Figure 27:
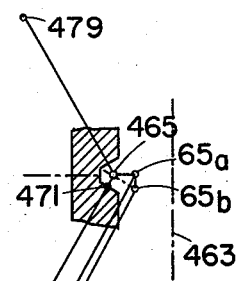
Figure 28:
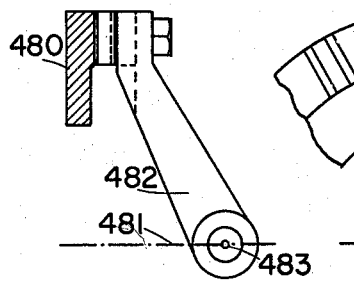
Figure 29:
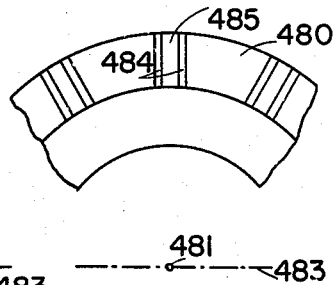
Figure 25:
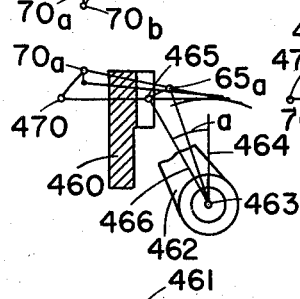
Figure 26:
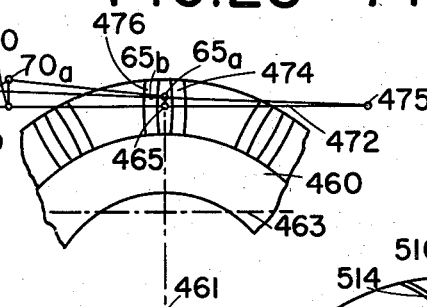
Figure 35:
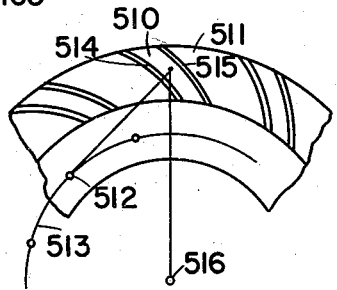
Figure 30:
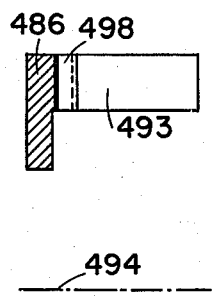
Figure 31:
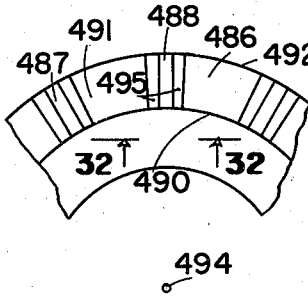
Figure 33:
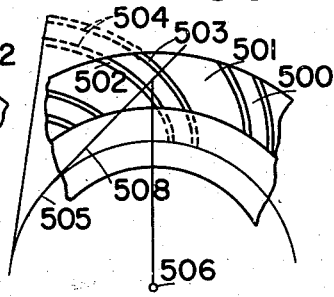
Figure 34:
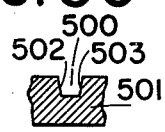
Figure 32:

Figs. 25, 26 and 27 are fragmentary views of an index plate made according to a further embodiment of this invention and having its notches disposed on its side faces, Fig. 25 being an axial section of the index plate, and showing, also fragmentarily the locking dog; Fig. 26 being a view along the axis of the index plate; and Fig. 27 being a partial transverse section through the index plate, taken parallel to the pivot axis of the locking dog;

Fig. 28 is an axial section showing an index plate made according to a still further embodiment of the invention, and a locking dog in engagement therewith, and illustrating the special case where the pivot axis of the locking dog intersects the axis of the index plate;

Fig. 29 is a fragmentary view taken along the axis of this index plate and looking at the active face thereof;

Fig. 30 is a partial axial section showing an index plate and a cooperating locking dog made according to a still further embodiment of the invention, the locking dog being here movable in the direction of the axis of the index plate;

Fig. 31 is an end view of the index plate shown in Fig. 30;

Fig. 32 is a fragmentary section on the line 32—32 of Fig. 31, looking in the direction of the arrows;

Fig. 33 is a fragmentary end view of an index plate, constructed according to a still further embodiment of the present invention, the plate here having notches which have involute helical side surfaces;

Fig. 34 is a normal section through one of the notches of the index plate of Fig. 33; and Fig. 35 is a view similar to Fig. 33 but showing an index plate constructed according to a still further embodiment of the present invention.

Referring now to the drawings by numerals of reference, and first to the embodiment of the invention illustrated in Figs. 1 to 4 inclusive, 40 denotes an index plate which is rigidly secured to a work spindle 41 as by screws 42. The work spindle 41 is journaled in two axially spaced bearings 43 and 44 (Fig. 2). Bearing 43 seats in a stationary sleeve 45 which is rigidly held in stationary support members 46 and 47, and which is secured axially therein by a shoulder 48 at one end, and by a nut 50 at its other end. The nut 50 threads on the sleeve 45. The bearing 44 seats directly in the support member 47.

The index plate has a plurality of equiangularly spaced peripheral notches 51, that are adapted to be engaged by locking dogs or pawls 52 and 74, to lock the index plate, and the spindle 41, to which it is secured, against rotation. The dog or pawl 52 is adapted to swing into and out of engagement with the index plate about a shaft 53 that is mounted parallel to the spindle 41 to oscillate in stationary bearing members 54 and 55 (Fig. 2).

The indexing motion is effected by operation of a rotary face-plate 56 (Figs. 1 and 3). The face-plate has a diametral slot 59 therein, in which a slide 58 is radially adjustable toward or away from the axis 60 of the face plate. This adjustment is made by rotation of a screw 61 which threads into the slide 58; and after adjustment the slide or block 58 may be locked in adjusted position in any known manner.

The slide 58 carries a crank-pin 57 which, in turn, carries a sliding block or roller 62 (Fig. 1), which engages sides 63 of the straight slot of a Scotch-yoke which is integral with a sliding bar 64. This bar is mounted to slide in bearings 65, 65', 65". Rotation of the face plate 56, therefore, reciprocates the bar 64.

The bar 64 has integral rack teeth 66 which mesh with teeth 67 of an oscillatory member 68; so that as the rack reciprocates, the member 68 oscillates on the work spindle. The oscillatory member is journaled by balls 69 on the work spindle 41. The balls run in V-shaped grooves 71, 72 provided on the opposed faces of the work spindle and of oscillatory member 68, respectively. Since each ball contacts with both sides of each groove, the balls hold the member 68 in both directions and support it rigidly.

The member 68 has a projection 70 rigidly secured to it as by rivets 79. Projection 70 forms a bearing 72' for a shaft 73 which extends parallel to the work spindle 41. Locking dog or pawl 74 is rigidly secured to this shaft 73 at one end thereof, for instance, by a pin 75 (Fig. 2) which extends through the shaft 73 and the hub 74' of this locking dog. If desired, additional guide means may be provided for the swinging member 68 and its projection 70.

In the position shown in Fig. 1, locking dog 74 is in engagement with the notch 51" of the index plate, while the dog 52 is clear of the index plate. Thus the work spindle may be indexed as the member 68 swings in one direction under actuation of sliding bar 64. At the end of the indexing stroke of the sliding bar 64, the locking dog 74 swings out of engagement with the index plate, while the dog 52 has already swung into a notch 51 of the index plate. The dog 52 then takes over on reversal of motion of the bar 64. Since the dog 52 is carried by a shaft 53 which is journaled in stationary bearings 54 and 55 (Fig. 2) the index plate is held stationary while the bar 64 moves back to its initial position. With the gearing shown, the dog 74 takes over again at the reversal at the opposite end of the stroke of the bar 64. Hence, there is an indexing motion with each revolution of the face plate 56 (Figs. 1 and 3). The indexing motion lasts through half a turn of the face plate.

The swinging motion of the locking dogs 52 and 74 is controlled by cams 76 and 77, mounted coaxial with the work spindle 41. The diameters of the cams are shown somewhat exaggerated in Fig. 1 for the purposes of clearer illustration. Cam 76 has a pair of cam tracks, 76', 76", while cam 77 has a pair of cam tracks 77', 77".

The cam tracks 76', 76" are engaged by rollers 78', 78", respectively, mounted on lever arms 80', 80", respectively. These lever arms are rigidly secured to the shaft 53, and thereby to the locking dog 52. They positively control the position of the dog 52 in both directions. If desired, a spring may be provided which tends to turn the shaft 53 in one direction to keep the dog 52 is engagement with the index plate.

The cam tracks 77', 77" are engaged by rollers 81', 81" (Fig. 1) mounted on lever arms 82', 82", respectively, that are rigidly secured to shaft 73.

The cams 76 and 77 are so driven as to make one revolution per indexing cycle. Cam 76 operates on the locking dog 52 and turns at a uniform rate. If the cam 77 were to turn at a uniform rate, also, then it would have to be changed whenever the index is changed over to a different tooth number, because the locking dog 74 and the rollers 81', 81" are carried by the swinging member 68 and moved peripherally of the cam, thereby affecting the timing.

In accordance with the present invention both cams 76 and 77 are retained for all tooth numbers within the design limits of the index mechanism by rotating the cam 77 at a varying rate. Its motion consists of uniform rotation and of an oscillation added thereto, an oscillation identical with the oscillation of the member 68. In other words, relative motion between the axis of the shaft 73 and cam 77 is the same whether the member 68 oscillates or not.

The oscillation is added to the uniform rotation of the cam 77 by means of a differential 83 (Fig. 4). The uniformly rotating drive shaft 84, which is driven in time with face-plate 56, has one side gear 85 of the differential 83 keyed to it as denoted at 89. The planet carrier 86 is mounted on bearings 87, 88, and is formed integral with a gear 90, that meshes with the teeth 67 of the swinging member 68. It thereby oscillates like the member 68 but at a different ratio, a ratio of two to one in the instance illustrated. Rotatably mounted in the carrier 86 is a bevel gear planet 91 meshing both with the side gear 85 and with another opposed side gear 92. The two side gears have equal tooth numbers, and the side gear 92 receives the reversed uniform rotation of side gear 85 plus double the oscillation of the carrier 86, as readily understood. With this two to one ratio between the member 68 and the gear 90, its added angular oscillation is four times as large as the oscillation of the swinging member 68. Side gear 92 is journaled in carrier 86, and is connected with a cylindrical pinion 93 by a toothed face coupling 94. Pinion 93 thus turns with the side gear 92. It meshes with a gear 95 rigid with cam 77 (Fig. 2).

To produce the required added oscillation of the cam 77, the tooth ratio between the gear 95 and the pinion 93 should be four to one in the discussed instance. Furthermore, the shaft 84 should make four turns per revolution of the face plate 56. This ratio is indicated by the pitch circles 95′, 93′, and 96′ in Fig. 1 of the gears 93, 95 and 96 which connect cam 77 and face-plate 56. Gear 96 is secured to the shaft of the face-plate to rotate therewith; and it meshes with a pinion 98 that is keyed to shaft 84. Of course, other ratios than shown in Fig. 1 may be used between the face plate and cam 77.

The gear 97 of cam 76 is rotated by pinion 98. The tooth ratio between the gear 97 and pinion 98 is the same as between the gear 95 and pinion 93, that is, four to one in the instance cited. With the described arrangement, the cam 77 will have the oscillation of the swinging member 68 superimposed on its uniform rotation, while cam 76 turns at a uniform rate.

It is possible, also, to have the crank plate 56 make a plurality of turns per indexing operation. The index operation then occupies a smaller part of the total cycle, one quarter of it for two turns of the crank plate. This can be attained, for instance, by providing a gear ratio of two to one between the crank plate 56 and the driving shaft 84, while leaving the other ratios unchanged. The cams then revolve once while the face plate turns around twice. The face plate can also be rotated at varying velocity if desired.

The operation of the described embodiment of my invention is as follows: The drive shaft 84 (Fig. 4) is driven from any suitable source of power. As it rotates it drives crank plate 56 through gearing 98, 96 (Figs. 1 and 4), the gear 98 being secured to the shaft 84 by a key 99. As drive shaft 84 rotates it also drives cam 76 through gearing 98, 97 (Figs. 4 and 2); and cam 77 through differential 89 and gearing 93, 95 (Figs. 4 and 2). The gearing 98, 97 drives cam 76 at a uniform velocity. One element 85 of differential 89 is driven directly from drive shaft 84 at a uniform velocity in time with cam 76. Another element 86 of differential 89 is driven by oscillatory member 68 (Figs. 1, 2 and 4) through gearing 67, 90. As the crank plate 56 rotates, it drives bar 64 at a varying velocity through its Scotch-yoke connection with the bar; and the bar oscillates the member 68 through the geared connection 66, 67, therewith. The cam 77 is, therefore, driven at a varying velocity which is a combination of the motion received from elements 85 and 86. During indexing locking dog 74 is in engagement with a notch 51 of the index plate. At this time the roller 81′ is traveling on the high part of cam track 77′ and the roller 81″ is traveling on a low part of cam track 77″; and roller 78′ is traveling on a high part of cam track 76′, while roller 78″ is traveling on a low part of cam track 76″. Thus, as bar 64 moves to the left under actuation of the crank plate the work spindle 41 is rotated clockwise as viewed in Fig. 1, being driven from swinging members 68 through locking dog 74 which is in engagement with index plate 40. Just as the bar 64 is reversed by the Scotch yoke, roller 81′ rides down on a low part of cam track 77′ and roller 81″ rides up on a high part of cam track 77″. This causes locking dog 74 to be disengaged from index plate 40. Just before the bar 64 is reversed, also, roller 78′ rides down on a low part of cam track 76′ and roller 78″ rides up on a high part of cam track 76″. This causes locking dog 52 to engage a notch of index plate 40. As the bar 64 effects its return motion to the right, then, index plate 40 and the work spindle 41, to which it is secured, are held against rotation by locking dog 52 which is mounted on a stationary part of the machine through the bearings 54, 55 (Fig. 2) which support its shaft 53. Thus, during leftward movement of bar 64, the work spindle is indexed, and during the return, rightward movement of bar 64, the index pawl or dog 74 is reset relative to the index plate.

The index mechanism described above is suitable for use on a machine where the work and work spindle are stationary during operation on the work, and where the work and work spindle are only rotated for indexing.

With my invention, to index for a workpiece having a different tooth number requires, aside from change of the index plate, only a single adjustment. This adjustment is an adjustment of the slide 58 on crank plate 56. The slide 58 (Fig. 3) is adjusted to set the crank pin 57 to the required radial distance from the axis 60 of rotation of the crank plate. This adjustment is facilitated by a graduated dial 100 provided on the screw 61 and by graduations 101 provided on the crank plate 56 cooperating with a mark on the slide 58. The setting can also be checked by a gauge. It is a simple operation which can be performed accurately without extra skill.

Fig. 1 shows the positions of the parts at the middle of the indexing motion. Shafts 53 and 73 of the locking dogs 52 and 74 are then diametrically opposite each other. When the index plate has an even number of notches 51, there will be a notch 51′ diametrically opposite the notch 51″, which is engaged by the dog 74; and this notch 51′ will be in registry with the locking portion 52a of the locking dog 52. Both locking dogs 74 and 52 have the same dimensions. At the start of the indexing motion, and at its end, the shaft 73 is displaced from the shown middle position about the axis 41′ of the face plate by half an angular pitch. The index plate is then turned through half an angular pitch as compared with the position shown. Then the locking dog 52 is opposite a tooth of the index plate, if the number of notches is even and equal to the tooth number indexed for. To avoid an adjustment an index plate is provided having twice as many notches as the tooth number N to be indexed for. Then the locking dogs 52 and 74 will always have a notch to move into. Each of the two locking dogs 52 and 74 then engages alternate notches only, and different notches. Thus notches 1, 3 and 5 of the index plate are engaged successively by one of the locking dogs; and notches 2, 4, and 6 of the index plate are engaged successively by the other locking dog.

If the required double number of notches is so large that the adjacent notches crowd each other and leave unduly thin teeth, then a double index plate may be resorted to. This is indicated in Fig. 5, where 40′ and 40″ denote two index plates secured together to form a unit. Each contains a number of notches equal to the even number of teeth to be indexed for. The two plates are angularly displaced by half a pitch so that a space 102 of one plate 40′ is opposite to a tooth 103 of the other plate 40″. Dog 52 will engage the notches 102 of one plate; and dog 74 will engage the notches of the other plate. Operation with double index plates requires adjustment of the contact portion 52a of locking dog 52 so that it engages only plate 40′ and not 40″. Likewise, locking dog 74 must be adjusted so as to engage only plate 40″.

No problem exists when an uneven tooth number is to be indexed for. Then the notches of the index plate are not diametrically opposite exactly, but half a pitch distant from a diametrically opposite position. In the case of an uneven tooth number, the index plate may have a number of notches equal to the tooth number to be indexed for. These notches are all successively engaged by each of the two locking dogs.

In all cases, then, an additional adjustment is avoided, an adjustment which would require a skilled and dependable operator, and which can go wrong if not properly set. On uneven tooth numbers N, the number of notches of the index plate 40 should be equal to N, or to a multiple thereof. On even tooth numbers it should be equal to 2N, or a multiple thereof. Thus, seventy-two notches can be used for indexing a gear, or other part having thirty-six teeth, and also for parts having twenty-four teeth, or eighteen teeth, or twelve teeth, or nine teeth, or even six teeth. Seventy-five notches can simply be used for indexing a gear having seventy-five teeth, and also for a gear having twenty-five teeth.

The swinging member 68 has a portion 104 (Fig. 2) for approximate counter-balance of both the member 68 and the sliding bar 65, so that high speed operation is possible.

It is seen that the index described has the following distinguishing features: the indexing motion is supplied by a crank drive with an adjustable crank pin. It oscillates a swinging member, which is coaxial with an index plate. This member is alternately locked to and unlocked from the index plate. The successive locking and unlocking, connecting and disconnecting, is an individual operation different from the indexing operation proper. It is cam-controlled. The cam means are preferably coaxial with the index plate, and the cam, which governs connection and disconnection between the swinging member and the index plate, is preferably turned at varying speed resulting from the superposition of a uniform rotation on the adjustable oscillation of the swinging member. The swinging motion, which is periodically used for indexing, is a repetitive motion which goes on continuously. Indexing takes place once per stroke, once per two strokes, once per a given number of strokes, depending on the design and gearing provided.

It should be understood that the connection and the disconnection does not necessarily have to be operated mechanically, but could also be operated in any other suitable, known manner.

Fig. 6 illustrates diagrammatically a slightly modified embodiment of the invention. Here the swinging member, denoted by line 100—41', is driven from crank pin 57' through the link or connecting rod 57'—100, instead of being driven by a Scotch yoke and gearing. While this appears as a simpler design mechanically, the position of reversal of the swinging member corresponds to a turning angle of the crank arm 60'—57' which varies slightly with different lengths of stroke, especially when the stroke is relatively large. This tends to disturb the timing slightly; and therefore makes an additional adjustment desirable. For this reason, I prefer to use this embodiment of the invention only where the adjustment range is relatively small.

A further embodiment of the invention is illustrated in Figs. 7 to 14 inclusive. In this embodiment, the work rotates while it is being worked on, instead of being stationary as in the first described embodiment of the invention. It is oscillated about its axis, and is processed during motion in one direction. It is indexed during the return stroke.

One application of this embodiment of the invention is to a machine for grinding or cutting helical teeth on gears. In such a machine, the teeth may be cut or ground by reciprocating a form cutting tool, or a grinding wheel, in engagement with the work in the direction of the work axis, while the work is oscillated on its axis in time with the reciprocation of the tool, or the work may be reciprocated instead of the tool. The tool and work are disengaged from one another, and reengaged at opposite ends of the strokes, respectively; and the work is indexed during each return stroke.

In the embodiment of the invention illustrated in Figs. 7 to 9 inclusive, the index plate is denoted at 140. It is rigidly secured to a member or spindle 142 as by screws 141 (Fig. 8). Spindle 142 is mounted for rotation on stationary parts 145, 147 (Fig. 9) by bearings 143, 144, and is held in an axially fixed position thereby. Rotatably mounted adjacent the index plate 140 are a pair of swinging members 168, 168' resting on the stationary part 145.

They have gear teeth 167, 167', respectively (Fig. 7) which mesh with the rack teeth 166, 166', respectively, provided on a pair of sliding bars 164, 164', respectively. Bar 164 is slidably held in bearings 165', 165, 165''; and bar 164' is slidable in bearings 159', 159, 159''.

The sliding bars 164, 164' are reciprocated by means of crank pins 157, 157', respectively, which are radially adjustable on face plate members 156, 156', respectively, in known manner, as by means of screws, similar to the screw 61 (Fig. 3), which thread into blocks, similar to the block 58, on which the crank pins are mounted. A sliding block 162 is mounted on each crank pin 157, 157', and engages the slot 163 provided in an extension of the respective sliding bar, 164, 164'. In each case the drive is the same as has already been described with reference to Fig. 1. The teeth 167, 167' of oscillatory members 168, 168' are here, however, helical; and to balance the end thrust, a part 164a (Fig. 9) with plane sides parallel to the length of each rack 164, 164' is secured to each rack. These sides engage conical surfaces 168a rigid with the swinging members 168, 168', respectively. The two crank plates 156, 156' are rigidly secured to the same shaft 148 which is rotatably mounted in bearings 149, 149'. The shaft 148 is driven through a gear 150 which is secured thereto.

Parts 170, 170', are rigidly secured to the swinging members 168, 168', respectively. These parts have portions 172, 172', respectively, which form bearings, respectively, for shafts 173, 173' (Fig. 9). These portions have projections 169, 169', respectively (Figs. 8 and 9), which serve as guides, and which engage between stationary portion 145 and the part 155 that is rigidly secured thereto.

Rigidly secured to the shafts 173, 173', respectively, are the locking dogs or pawls 174, 174', respectively, and also the levers 182, 182', respectively. Rollers 181, 181' are mounted on lever 182 and rollers 178, 178' are mounted on lever 182'. Rollers 181, 181' engage tracks of cam 176, similar to the tracks 76', 76'' previously described, while rollers 178, 178' engage tracks of a cam 177 (Fig. 9) similar to tracks 77', 77'' previously described. Cams 176 and 177 are rotatably mounted coaxially with the work spindle 142. Cam 176 is rigidly secured to the hub of gear 197, mounted on the member 142 by bearings 201, 202. Cam 177 is rigidly secured to a gear 195, and rotatably mounted with it on the hub of gear 197, between the gear 197 and the cam 176. The gears 195, 197 are driven in a manner to be described hereinafter with reference to Fig. 11. The cams 176, 177 control the positions of the respective pawls 174, 174' (Fig. 8).

Fig. 7 shows an end position of oscillation and stroke. Here one pawl is beginning its engagement with the index plate 140 while the other pawl is releasing its hold on the index plate. Fig. 8 shows a middle position where one pawl 174 is in engagement with a notch 151 of the index plate 140, while the other pawl 174' is clear of the index plate.

As an example, if work is to be turned through one and one-half pitches during the working stroke, it may be indexed by returning it through one-half pitch during the return stroke. The difference is one pitch. Accordingly, the length of stroke is different for the two bars 164, 164'. In the example, the latter produces the one-half pitch movement of the work while bar 164 produces the one and one-half pitch movement. Adjustment for stroke is provided for the manner described with reference to Fig. 3.

The oscillatory motion of the work is timed with the cutting stroke. In the embodiment specifically illustrated, the axial motion, for cutting or grinding, is also imparted to the work. A work slide (not shown) fits into the hole 205 provided in member 142 and engages the plane guide surfaces 206, so that it turns with the member 142, but is also axially movable therein.

The reciprocation of the work slide in the member 142 is effected by a face plate 210 (Fig. 7) having an adjustable crank pin 211 which is adjustable on the face plate 210 in a manner similar to the adjustment of the crank pin 57 (Fig. 3) on the face plate 56. The face plate 210 is secured to a shaft directly underneath and parallel to the shaft 148. The face plate 210 and its shaft are driven at one to one ratio from the shaft 148 through a pair of gears, of which gear 150 is one. Crank pin 211 reciprocates a bar or slide 212 through a Scotch yoke drive such as the Scotch yoke drive 62, 63 (Fig. 1) previously described. At the opposite end of a bar or slide 212 there is a toothed part 213 (Figs. 8, 9 and 10) rigidly connected to or formed integral with this slide 212. This part is shown in section in Fig. 9 and in side view in Fig. 10.

On one side the part 213 has rack teeth 214 inclined to the direction of its motion. These teeth engage a counterpart rack 215 provided on a projecting part 216. This part is connected with the work slide to move axially of the work axis, without partaking in the turning motion of the work. It is connected to the work slide by a bearing 217 which permits relative turning motion about the work axis, and which gives a rigid axial connection.

As the slide 212, with rack 214 reciprocates in the direction of the length of the rack, the counterpart rack 215 is reciprocated in direct proportion, at right angles thereto, namely, in the direction of the work axis.

It should be noted that the reciprocations of all three slides, 212, 164, 164' are in direct proportion to one another. Moreover, the oscillations of the swinging members 168, 168' are also proportional thereto. Accordingly, the work and its slide describe a truly helical path on each working stroke. This is true for a uniform rotation of shaft 148; and it is also true when shaft 148 is rotated at repetitive varying speed.

On the side oppoiste to the rack teeth 214, the toothed part 213 has another set of rack teeth 220. These engage a counterpart rack 221 movable in a somewhat oblique direction, as shown in Fig. 10. Rack 221 is rigid with a counterbalance member moving in this direction. It forms a counterbalance for the axial acceleration of the work slide, and for the lateral acceleration of the slide 212.

Sliding bar 164' provides a partial counterbalance for sliding bar 164 as regards direct inertia loads. Swinging member 168' is also to some extent a counterbalance for member 168. For more complete balance a circular arcuate projection 224 (Fig. 9) is rigidly secured to part 170, and thereby to the swinging member 168. Counterbalancing parts of suitable and changeable weight may be secured to the projection 224. The outline of one such part is indicated in dotted lines at 223. In this way the direct inertia forces can be balanced or approximately balanced.

What still remains unbalanced with the described structure is the inertia moment, which results from the moving masses. This moment is in a plane perpendicular to the axis of the index plate. It can be balanced by a member movable on any suitably positioned axis having the same direction as the axis of the index plate, that is, an axis parallel to or in line with the axis of the index plate. Member 225 (Fig. 7) is the mass balance member chosen. This member is an oscillatory member which swings only in a limited arc, and does not turn around completely.

Mass balance for indexing

It will now be shown why an oscillatory member 225 can be used to balance the inertia moments resulting from indexing, although indexing is a different kind of motion, namely, an intermittent motion.

Fig. 12 is a velocity diagram, in which the angular velocity multiplied by the moment of inertia is plotted as the ordinate in terms of the turning angle, plotted as the abscissa, of a uniformly rotating part, such as part 148. The horizontal distance between the points 230 and 231 corresponds to a full turn of said shaft, and to a full cycle of the velocity. Curve 232 describes the product of angular velocity and moment of inertia of both swinging members 168, 168', added together, and the product also of member 142 and the work support and work added to it in such a way as though member 142 were continuously locked to swinging member 168'. Also, the sliding bars 164, 164' may be allowed for. This curve is a sine curve when shaft 148 turns uniformly.

The curved portions 233 represent the addition to be made because member 141 is periodically connected with swinging member 168, which moves at a faster rate than member 168'. The curved portions 233 are entirely above the abscissa axis 234. Dotted line 235 intersects the curved portions in such a way that the area above that line is equal to the area between that line and axis 234.

Fig. 13 shows the curved portions 233 of Fig. 12 superimposed on the sine curve 232 so that a curve 236 results. This curve extends to a larger distance above the abscissa axis 234 than below it.

The inertia moments are proportional to the angular acceleration, that is, to the slope of curve 236. The velocity itself does not matter. The same acceleration pattern can be attained if we add or subtract a constant angular velocity. We do that in such a way on the mass balance member that a pure reciprocation results, that is, one without angular advance, without periodic indexing. The turning angle then returns to zero in each cycle. Since the moment of inertia of the mass balance member is constant during the cycle, Fig. 13 represents, also, the velocity diagram desired for this member. In a velocity diagram, the turning angle shows up as the area included between the curve and the selected abscissa axis up to the ordinate at a considered point, as well known. Pure reciprocation requires that the area between the curve and the selected abscissa axis be equal above and below said axis, which is indicated by dotted line 240.

It should be noted that the intersection points of curve 236 with line 240 are unequally spaced; that the upper part 236' of the part 236 intersects the line 240 at two points spaced closer together than the lower part 236". Also the upper part reaches to a larger distance from the line 240 than the lower part, and shows, therefore, a higher maximum velocity.

Velocity distributions of this kind can be closely approximated by a linkage, such as diagrammatically indicated at Fig. 14. This diagram represents a view on a reduced scale taken in the direction of shaft 148 upwardly in Fig. 7. Shaft 148 is indicated by its axis. Gears are shown in this diagram by their pitch circles. Gear 150 on shaft 148 drives a gear 242 on a shaft 243, to which the face plate 210 is secured, as shown in Fig. 7. The near end of the shaft 243 has a crank pin 244 radially adjustable therefrom. This crank pin engages a straight slot 244—245 of an oscillatory part 246 pivoted at 245. The pivot 245 is adjustable on a line 148—243 extending radially of the axis 243. Oscillatory part 246 is operatively connected with mass balance member 225 (Fig. 7) by ball joint 250, link 247, and ball joint 248. Ball joint 250 may be made adjustable on part 246, so that its distance from pivot 245 may be changed. It is seen that the motion of the mass balance member 225 and of part 246 are similar in character, because of the relatively long link 247. The motion of the oscillatory part 246, in turn, can be made to conform approximately to the characteristic indicated by the curve 236 of Fig. 13.

The shown position of pivot 245 about shaft 243 calls for the connection of the index plate with the swinging member 168' to start in the position shown in Figs. 7 and 14 for clockwise rotation of shaft 243; and it calls for said connection to cease in the shown position when the shaft 243 rotates counterclockwise.

When the shaft 243 rotates clockwise, the oscillatory part 246 is already past its reversal in the shown position; and after half a turn still has not quite reached its next reversal. In this position, then, it takes more than half a turn of shaft 243 between reversals. This position corresponds to the lower part 236″ of curve 236. It also shows less maximum speed than the upper part.

The linkage settings can be arrived at either by computation, or by trial on the drafting board.

Dynamic mass balance is important for high speed operation. It has, however, the drawback that it adds to the energy stored up in the moving parts, and particularly to the changes of this kinetic energy. Ordinarily, change of kinetic energy is supplied from the outside, and with anything but a very short drive, deflections are bound to occur. This seriously hampers the accuracy when the motions are timed, as in the instance illustrated.

Therefore, together with mass balance, I preferably also provide an inertia member 252 (Fig. 7) for directly supplying the varying kinetic energy and storing it up again. This member is connected with shaft 148 by varying velocity gearing comprising a cylindrical pinion 253 meshing with a face gear 254 at a predetermined varying velocity ratio. Member 252 has a head 255, with provision for changing its inertia moment. Such inertia members have been disclosed in my copending application Serial No. 494,076, filed March 14, 1955.

*The cam drive*

To avoid the need of a special cam for each variation in oscillation of a swinging member 168, 168′, the cams 176, 177 are rotated at a varying rate. The rotation of each cam consists of a basic rotation, which may, or may not, be uniform, and an oscillation added to this basic rotation. The oscillation to be added is the same as the oscillation of the respective swinging member 168 or 168′, so that the relative rotation of the cams with respect to the axes of the shaft 173, 173′, is constant. Because of the constant relative motion, the correct timing is preserved.

The drive arrangement disclosed in Fig. 11 preserves the correct timing automatically for all amounts of oscillation, without requiring any setting changes other than adjustment of the crank pin.

Power is applied to the end 256 of the shaft 257. Rigidly secured to the shaft 257 is a spur pinion 258, which meshes with gear 150 indicated in Fig. 7 and shown diagrammatically in Fig. 14. It thereby drives the shaft 148 and also the face plate 210.

Rigidly secured to shaft 257 are the side gears 260 and 261 of a pair of differentials 262 and 263. The planet carriers 262′, 263′ of these differentials are suitably journaled in bearings 264, 265, respectively, and formed integral with gear segments 266, 267, respectively. These segments mesh with rack teeth 268, 269, respectively, provided on the sliding bars 164′, 164, respectively. The motions of the sliding bars are at right angles to the drawing plane of Fig. 11. Further on in their lengths the sliding bars have teeth 166′, 166 which engage the swinging members 168′, 168. It is seen, then, that each planet carrier is oscillated in direct proportion to the motion of the respective sliding bar and its swinging member.

The other side gears 270, 271 of the differentials 262, 263 thus receive a motion which is composed of the reverse motion of the shaft 257 and of side gears 260, 261 connected therewith, and of twice the oscillation of the planet carriers 262′, 263′, respectively. This motion is transmitted with a slight speed-up to bevel gears 274, 275 which mesh with side gears 270, 271, respectively.

The bevel gears are formed integral with stub shafts 276, 277, respectively, which are parallel to the axis 142′ of the index plate and of the cams 176, 177. A spur gear 278 is formed rigid with stub shaft 276; and a spur gear 279 is formed rigid with a stub shaft 277. These spur gears mesh with gears 195, 197 (Fig. 9) of the cams 177, 176, respectively.

If desired, the side gears 270, 271, and also 260, 261, may be form-cut gears; and the bevel gears 274, 275 are then simply generated conjugate to these form-cut gears in known manner.

As an example, if the size of the gear segments 266, 267 is made such that they turn through double the angle through which the swinging members 168, 168′ turn, then the additional motion transmitted to the side gears 270, 271 is four times the turning angle of the respective swinging members. The turning ratio between shafts 257 and 148 should then be four to one, shaft 257 making four turns to one turn of shaft 148, that is, the tooth ratio of the gears 150, 258 should be four to one. Likewise, the turning ratio between the side gears 270, 271 and cam gears 195, 197, respectively, should be four to one. This is the over-all ratio, namely, the turning ratio of, for instance, gears 270, 274 multiplied by the turning ratio of gears 278, 195. In this way, the oscillation of the respective swinging member is superimposed on the uniform rotation of the cams. With the arrangement indicated, also, it is added in the same direction as the oscillation of the swinging members.

Known means may be used for guarding, lubrication, etc. They are not shown in the patent drawings, since they are not part of the invention.

*Modified cam drive*

Instead of using rotary cams, which turn around completely and continuously, it is also possible to use oscillatory cams. Such cams, which are also arranged coaxially with the work spindle, perform an assumed constant oscillation per cycle, to which is preferably added the oscillation of the respective swinging member 168, 168′. The addition of these motions may be accomplished in the manner already described.

Figure 16:
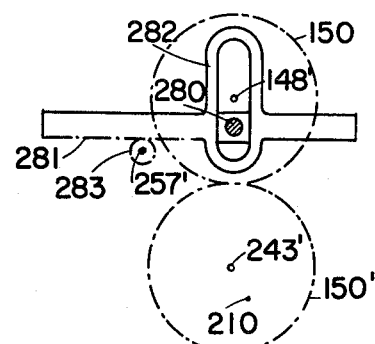
Fig. 16 is a diagram illustrating the drive for oscillating the cams of the modification of the invention illustrated in Fig. 15.

The basic oscillation of the cams may be effected by a fixed crank 280 (Fig. 16) which is part of the shaft 148′. This shaft also carries a gear 150, to which turning motion is applied. The gear 150 drives the face plate 210 through a gear 150′ at a one to one ratio as in the embodiment already described. In the diagram, the gears are indicated by their pitch circles only. Crank 280 reciprocates a rack 281 through a Scotch yoke 282. The rack 281 meshes with a pinion 283 which is rigid with a shaft 257′. The latter corresponds to shaft 257 of the previously described embodiment of the invention. From thereon the cam drive is the same as already described.

The phase of the reciprocation of the rack 281 is shifted as compared with the reciprocation of the sliding bars 164, 164′, so that it has its maximum speed at the points of reversal of the sliding bars.

Figure 15:
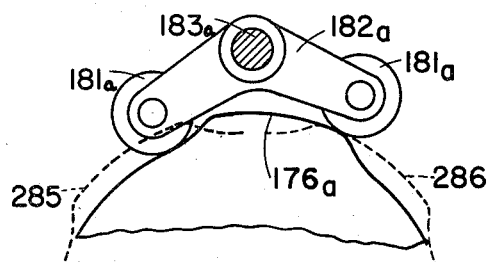
Fig. 15 is a fragmentary view showing the oscillatory cams for controlling the position of the locking parts in a slightly modified embodiment of the invention.

With oscillatory cams, a single cam track 176a (Fig. 15) can be used. Both rollers 181a of the double lever 182a, which is rigidly secured to a shaft 183a that also carries the locking pawl, can engage this single cam track 176a. The cam is shown in Fig. 15 in an intermediate position which corresponds to the reversal position of the swinging members 168, 168′. Counterclockwise rotation from the position shown will immediately start to turn the double lever 182a and the pawl, which is rigid with it. End positions of the cam track are shown in dotted lines at 285 and 286, respectively.

*Axial motion*

In the embodiments thus far described, the slides actuated by the adjustable crank pins are disposed to move tangentially to the spindle 142 to which the index plate is fixed. These slides move in a direction at right angles to the axis 142′ of the spindle and of the index plate.

Figure 17:
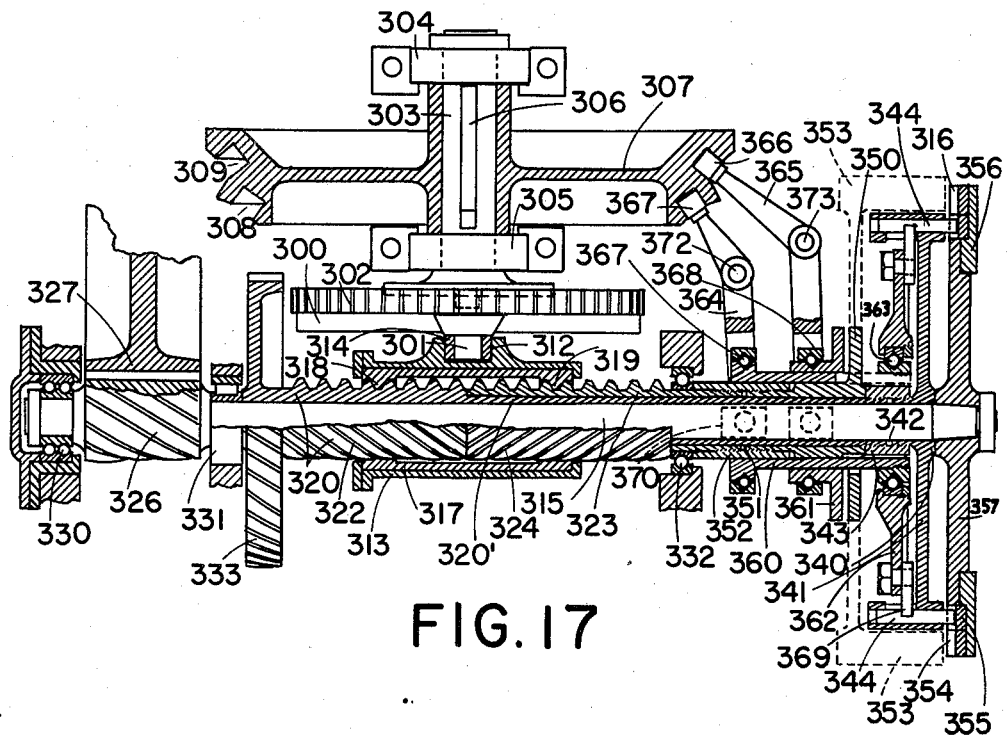
Fig. 17 is a part axial section, part view of a still further embodiment of the invention, in which the index operating slide moves axially of the index plate.

Fig. 17 illustrates an embodiment where the slide moves in the direction of the axis of the index plate. Here, a crank plate 300 with an adjustable crank pin 301 is formed integral with a gear 302 driven from an outside source. It is rigidly secured to a shaft 303 which is journaled in bearings 304, 305. Rigidly secured to the shaft by a key 306 is a cam member 307 having two cam tracks 308, 309.

The crank pin 301 engages in a sliding block 314 which, in turn, engages in a transverse slot 312 provided in a slide 313. This slide is constrained by guide means above and below the drawing plane, and not indicated, to move in the direction of the axis of the shaft 315, to which an index plate unit 316 is rigidly secured. Rotatably held in an axially fixed position on slide 313 is a member 317 which at its ends has internal helical teeth 318, 319 of opposite hand, respectively. They constitute two spaced helical gears of opposite hand formed integral with one another. In engagement with teeth 318 are the external helical teeth 322 of a sleeve member 320. On the other side a sleeve member 323 is provided having external helical teeth 324 that mesh with the internal teeth 319. Sleeve member 323 is rotatably mounted on the outside of an elongated hub portion 320' of sleeve 320, with left-hand end abutting against the adjacent toothed end of sleeve 320.

Mounted within the sleeve members 320, 323 is a shaft 315 which is rigid with the index plate unit 316. At its end opposite from the index plate unit this shaft has a helical pinion 326 formed integral with it. This pinion meshes with a gear 327, and with that gear constitutes the final reduction drive.

The unit comprising shaft 315 and sleeve members 320, 323 is rotatably journaled in bearings 330, 331, 332. Drive is applied through a helical gear 333 formed integral with sleeve member 320.

The index plate unit can be connected with either sleeve member 320 or sleeve member 323. When connected with sleeve member 320 it receives the motion of gear 333 directly; and shaft 315 then moves with the member 320. When connected with sleeve member 323, the shaft 315 moves with sleeve member 323, whose motion depends on the motion of slide 313. This motion results in a relative turning motion of the sleeve members 320, 323 in proportion to the slide motion. The turning motion of sleeve member 323 is composed of this relative turning motion, which is added to the uniform rotation of the sleeve member 320. The relative turning motion is used for indexing.

Rigidly secured to sleeve member 320 at its right hand end is a member 340 having arms 341. The connection is by means of a toothed face coupling 342, which is maintained in engagement by a nut 343. This nut has threads of opposite hand which thread onto the sleeve member 320 and the hub portion of member 340, respectively. Slidably mounted in the outer extremities of the arms 341 of the member 340 are a pair of locking pins 344. They are movable toward and from locking engagement with the toothed face part 355 of the index plate unit 316 in the direction of the shaft 315.

A member 350, similar to member 340, is rigidly secured to sleeve member 323 by a toothed face coupling 351 kept in rigid engagement by a nut, or internally threaded sleeve 352 having threads of opposite hand. Member 350 also extends out to the periphery of the index plate unit or index plate; but its arms are disposed transversely at right angles to the arms of the member 340 as indicated in dotted lines at 353. Like member 340, member 350 also carries locking pins (not shown) movable axially toward and away from the index plate unit. They engage the outer part 354 of the index plate unit 316. The two parts 354 and 355 of the index plate unit are rigidly secured to a plate 356, which is secured to a plate 357 which is keyed or otherwise fastened to spindle 315.

The locking pins of the two members 340 and 350 are moved toward and from locking positions by sliding sleeves 360, 361, respectively. Both these sleeves turn with the sleeve member 323 and are axially movable thereon. Sliding sleeve 360 reaches through openings provided in member 350 and is connected to arms 362 by a ball bearing 363. Arm 362 has dogs 369 secured to it which engage in grooves in pins 344 to shift the pins 344 as the sleeve 360 is shifted. Similar arms go out from the sliding sleeve 361 into shifting engagement with the locking pins carried by member 350.

The sliding sleeves 360, 361 themselves are shifted by means of levers 364, 365, respectively. At one end these levers have rollers 366, 367 that engage cam tracks 309, 308, respectively, of cam member 307. At their opposite ends these levers are forked and in engagement with the outer races of ball bearings 367, 368 which have V-shaped races. Engagement is through pivoted shoes 370 indicated in dotted lines.

Accordingly, the cam member will move the locking pins intermittently in and out of locking position, one pair of locking pins starting to come out when the other pair is about to reach full locking position.

This embodiment of the invention is especially useful for superimposing an indexing motion on a continuous rotation. In this case, where the cam operated levers 364, 365 are mounted on stationary pivots 372, 373, respectively, the cam member may be rotated at a uniform speed. The provisions described with reference to cams 176, 177 are here unnecessary.

*The notches*

One of the important features of the present invention is the shape of the notches provided on the inex plate and on the wholly matching sides of the locking dogs or pawls. The function of an index plate is not merely a static one, not merely to hold and lock. It also has to supply the final accuracy of the work position. When the locking dog or pawl moves into locking position, the index plate is only approximately at the right place. Moreover, it may still be moving very slightly. The exact and final position is attained through the engagement of the locking dogs with the index plate. This engagement provides a correction of position, which, of course, should be very small. In accordance with the present invention, this engagement, which starts just prior to reaching full depth, is made between the sides of the notch and the sides of the locking dog or pawl, rather than between the side of one and the end corner of the other. By improving the contact near full depth position, the index is made to stand up much longer with full accuracy.

Fig. 18 illustrates the co-action of the conventional locking dog 403' and a notch 401' of a conventional index plate 400'. The notch has straight sides 405 and the locking dog has matching straight sides 406. Half-depth position of the locking dog is shown in Fig. 18. It is seen that in this less than full depth position the locking dog 403' lies tilted in the notch 401'. If the index plate 400' is slightly displaced about its axis 404 from the position shown, either corner 407 of the notch or corner 408 of the dog will hit, depending on the direction of displacement. This is not a desirable contact. It concentrates contact stresses, and produces relatively rapid wear because of the sliding. Near full depth, where the locking dog is supposed to provide correction of position of the index plate, the tilt angle of the locking dog in the notch is smaller, but there is still corner contact; and the objection is still there.

Fig. 19 shows the same position of a locking dog 403; but the notch 401 and dog 403 are here formed in accordance with the principles of the present invention. Here the locking dog 403 continues to match the depthwise direction of the notch in part-depth position. If the index plate 400 is displaced angularly in one direction, as shown in Fig. 21, the side 410 of the locking dog still remains essentially in contact with the side 412 of the notch. When the index plate is displaced in the opposite direction (Fig. 22), the side 411 of the locking dog remains essentially in contact with the side 413 of the notch. Objectional corner contact is avoided. Figs. 21 and 22 show the locking dog in half-depth position, the same as in Fig. 19. Full depth position is shown in Fig. 20.

In the embodiment of Figs. 19 to 23 the side profiles 412, 413 of the notch 401 are circular arcs. Profile 412 is concave; and profile 413 is convex. The centers 417 and 418, respectively, of these circular arcs lie approximately on the center line 416 (Fig. 20) which connects the centers 404 and 415 of the index plate 400 and of the locking dog 403, respectively, in full depth position.

When the sides of the locking dog are to match the sides of the notches exactly, then the centers 417, 418 of the sides of a notch are also the centers of respective side profiles of the locking dog.

Centers 417 and 418, which lie on center line 416, start to move at right angles to the center line when turned about the axis 404 of the index plate, and also when turned about the pivot axis 415. They move in the same direction when turned a small amount about either or both axes. This is the secret of the favorable showing of these profiles. The profile centers of the index plate and of the locking member tend to stay together, when the plate and member are turned a small amount on their axes to contact with each other.

A more general construction will now be described with reference to Fig. 23. In this diagram 404 and 415 again denote the axes of the index plate and the pivot axis of the locking dog, respectively. 420 is a mean point of a space of the index plate. The profile normals 421, 422 are the normals at full depth position. In accordance with the general principle, the shape is so determined that the mean contact normals 421, 422 tend to stay normal to the side surfaces of the notch when moved a moderate amount with the locking dog away from full depth position, while the locking dog is maintained in contact with the notch. In other words, when the normal 422 is turned about the pivot axis 415, its point 420 moves to a position 420′, and the normal remains tangent to a circle 425 centered at 415 on the pivot axis. 422′ denotes this position of the normal. In this position, however, the locking dog is not in contact with the notch. To bring it into contact, as required, the index plate or the normal is turned about axis 404. While so turned, the normal moves into a position 422″, staying tangent to a circle 426 concentric with the axis 404 of the index plate. At the small displacements considered, the turning angle corresponds to a lateral displacement 420′—420″ of point 420, where the point 420″ lies on a line 427 parallel to the tangent to the notch profile and perpendicular to the normal 422. In this new position 422″, the normal intersects the original position 422 at a point 418, the curvature center of the notch profile on that side. Point 418 thus determined is found to lie on the center line 416. Point 417 can be determined similarly by construction and is found to lie also on the center line 416.

Instead of going through the steps geometrically, they may be determined by computation. In doing so, the rules of dealing with infinitesimal quantities are preferably applied, that is, the rules of calculus. This simplifies the procedure. In other words, what we want to determine is the curvature center of the notch profile such that matching side profiles of the notch and locking dog tend to stay tangent and in contact with each other at an infinitesimal displacement away from full depth position. This produces the illustrated result.

If, desired, the profile ends may be eased off slightly, as is customary on gear teeth. Then the centers of the profile in full depth position (Fig. 20) do not coincide. The convex arc 413 of the notch may then have a center 431, while the mating circular arc profile 411 of the locking dog has a center 433. Both centers 431, 433 lie on a normal 421, on which the center 417 also lies. The centers 431, 433 are adjacent the center line 416, and preferably on opposite sides thereof. The concave arc 411 has a slightly larger radius than the convex arc 413.

On the opposite side of the notch, the concave arc 412 may have a center 430, while the convex arc 410 of the locking dog has a center 432, both located on the normal 422.

The slight modification in profiles thus achieved does not alter the principles; and it makes the parts less sensitive to slight errors and deflections, and is generally helpful. It applies to all embodiments of the invention.

Fig. 24 shows a further modification of the index plate and locking dog. Here the locking dog 440 is movable in a straight radial line 441—442 to and from locking engagement with the notch 443 of the index plate 444. Mathematically, this motion can be considered a motion about a pivot axis infinitely far away in the direction of the line 445, which is at right angles to the direction of the motion of part 440. Line 445 is then the center line, the line connecting center 442 of the index plate with the center of the motion; and the profile center 446, except for ease-off, should lie on this center line 445. It is its intersection with the respective normal 447 passing through the mean point 441. Here, then, both sides of notch 443 should be convex, convex arcs 450 centered on one side on line 445 at 446. The profiles 451 of the locking part 440 are corresponding concave circular arcs.

Figs. 23 and 24 show the inclination of the side profiles exaggerated for convenience in illustration. However, any desired profile inclination may be chosen; and it does not have necessarily to be equal on the two sides.

Notches on the side

The principles of notch design, in accordance with the present invention, apply also with notches provided on the side of the index plate.

Figs. 25 to 27 illustrate one such design. Here the index plate 460 has an axis 461; and the locking dog 462 is pivoted on an axis 463 which is offset from axis 461 and lies in a plane 464 perpendicular to the axis 461. 465 denotes the mean point of the notch space. Plane 466 containing the pivot axis 463 and mean point 465 is inclined at an angle $a$ to the plane 464.

Point 470 lies on the normal through point 465 to the notch 467, at a given distance from this mean point 465. This distance appears in full length in Fig. 27. The normal 465—470 intersects the notch side surface at a point 471 of the profile of one side of the notch.

In accordance with the general principles, the considered normal 465—470 is first turned through a small angle about pivot axis 463, whereby the points 465 and 470 move to positions 65a and 70a, respectively. In this displacement, the normal 65a—70a remains tangent to a circle centered on the pivot axis 463 in the view of Fig. 25. From this position the normal should be turned about the axis 461 of the index plate until the considered side of the locking dog is again in contact with the notch. That is, point 65a should move to position 65b (Fig. 27) back to the plane 465—65b, which is parallel to the tangent plane of the notch at point 471. 70b—65b is then the new position of the normal.

In the view of Fig. 27, the normal 70b—65b appears parallel to the original position 470—465 of the normal at the small turning angles considered; and distance 70b—65b appears equal to distance 470—465. This is an indication that the inclination of the normal to the plane of the index plate has not been changed, that is, to a plane perpendicular to the axis 461. In mathematical language, when the normal is moved through infinitesimal angles, its change in inclination is negligible. In other words, the new normal represents the same pressure angle as the initial one.

In the view along the axis 461 of the index plate (Fig. 26) the normal 70b—65b appears inclined to a plane 472 which is laid through the original normal 470—465 parallel to the axis 461 of the index plate. In this view this plane coincides with the projected normal 470—465. The normal 70b—65b intersects this plane at a point 475. It is seen, then, that the two normals 470—465 and 70b—65b of equal inclination to the plane of the index plate can be considered normals of a concavely curved conical surface 476, whose axis passes through point 475 and is parallel to the axis 461 of the index plate. In other words, a concavely curved conical surface of this description fulfills our requirement. It retains the contact between the sides of the notches and the sides of the locking member in positions moderately away from full depth position. It therefore provides the contact looked for in the correcting movement.

A similar construction can be made on the other side. There a normal 465—479 (Fig. 27) is considered. It results in an axis 478 (Fig. 26) of a concave conical surface 474.

The described geometric construction can be laid down in algebraic terms, assuming:

R = the radius from the axis 461 to the point 465
r = the distance 463—465 (Fig. 25)
r' = r.cos a (angle a see Fig. 25)
$R_x$ = 465—475 (Fig. 26)
φ = pressure angle = the inclination of normal 470—465 to a plane perpendicular to the axis 461 of the index plate (see Fig. 27)

Using these symbols, the following formula is obtained:

$$\frac{1}{R_x} = \frac{\tan \varphi}{\tan a}\left(\frac{1}{r'} - \frac{1}{R}\right)$$

The term within the parentheses becomes zero when r' is equal to R, that is, when the pivot axis 463 intersects axis 461 of the index plate, and extends at right angles thereto. In this case $$\frac{1}{R_x}$$

becomes zero; $R_x$ is infinitely large. The axis of the conical surface is then infinitely far away in plane 472. The conical surface itself has become a plane.

Figs. 28 and 29 illustrate this case. The pivot axis 483 of the locking dog 482 intersects the axis 481 of the index plate 480 and extends at right angles thereto. The side surfaces 484 of a notch 485 of the index plate are straight. They are planes.

It should be understood that the above general procedure determines a requirement to be fulfilled to obtain the desired property. It does not determine the surface completely. There are indeed an infinite number of solutions. The simplest and most practical one has been picked.

*Axial displacement*

The above procedure is also applicable to the case where the locking dog is movable in the direction of the axis of the index plate without turning or tilting. However, an analysis is unnecessary to this case. The side surfaces of the notch in this case should simply be helical surfaces. Helical surfaces have the property that they continue in surface contact when they are displaced relatively to each other along their axis, and are kept in engagement by a relative turning motion about their axis. The term "helical surfaces" as used here is meant to indicate helical surfaces of constant lead, surfaces such as may be described by turning a line on an axis and moving it simultaneously along said axis at a constant proportion to said turning motion.

Accordingly, notches with helical side surfaces conform to the principles of the present invention when used together with matching locking dogs movable in the direction of the axis of said surfaces and of the index plate.

In Figs. 30 and 31, the index plate 486 has notches 487 having bottoms 488 preferably of constant width from end to end. The notches 487 extend from the inner end 490 of the face 491 of the index plate to its outer end 492. The locking dog 493 is movable in the direction of the axis 494 of the index plate to and from locking position. The side surfaces 495 of the notch are helical surfaces of opposite hand, and each contains helices of a given lead. At the inner end of the face their profiles are as indicated in full lines at 496 in Fig. 32. At the outer end they are as indicated in dotted lines at 497. In other words, the sides of the notches have varying pressure angles, pressure angles which increase from the inner end of a notch to its outer end.

The side surfaces of the end 498 of the locking dog 493 engaging the notch are also helical surfaces matching the helical surfaces of the notch, either with full surface contact, or with some ease-off.

The varying pressure angle increases the cost of production of the index plate and locking dog.

One helicoid, however, has a constant normal pressure angle and a constant inclination of its surface normals. This is the involute helicoid. It is indicated in Fig. 33. Each notch 500 of index plate 501 has side surfaces 502, 503 which extend along involutes 504 lengthwise. The involutes have a common base circle 505 concentric with the axis 506 of the index plate. The involute helicoids are perpendicular to all planes tangent to the base circle 505 which are parallel to the axis of the index plate. 508 is one such plane, which is normal to a notch 500 and also to the other notches, if extended. An index plate of this kind has a constant cross-section from end to end of a notch, such a cross-section being indicated in Fig. 34. This facilitates production.

Fig. 30 can also be considered an axial section of the index plate 501 of Fig. 33. The locking member is movable in the direction of the axis of the index plate and has side surfaces which match the involute helical notch.

Production can further be simplified when the involute helicoids are approximated by circular arcs. Thus, the notch 510 of index plate 511 of Fig. 35 extends along a circular arc centered at 512 on or near the base circle 513 of the involute it approximates. The sides 514, 515 of each notch 510 may be made coaxial conical surfaces, whose axis passes through the center 512 and is parallel to the axis 516 of the index plate. The end of the locking dog then also has conical side surfaces matching the side surfaces of the notches 510.

While the invention has been described in connection with several different embodiments and uses thereof, it is capable of further modification and use, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An indexing mechanism comprising a frame, a spindle rotatably mounted on said frame, an index plate rigidly secured to said spindle, a swinging member mounted for oscillation about the axis of said spindle, a rotary crank plate having a crank pin rigidly secured thereto and offset from its axis, means operatively connecting said pin with said swinging member so that rotation of said crank plate oscillates said swinging member, a first dog carried by said swinging member for movement into and out of engagement with said index plate to intermittently connect and disconnect said swinging member and said index plate, said first dog contacting said index plate along opposite side surfaces of said first dog to hold said plate against movement relative to said swinging member in both directions when said dog is engaged with said plate, a part carried by said frame, a second dog mounted on said part for intermittently connecting said part and said index plate so that said index plate is alternately connected to said part and to said swinging member, means for controlling the movement of said second dog into and out of engagement with said index plate, and rotating means for controlling the movement of said first dog into and out of engagement with said index plate.

2. An indexing mechanism comprising a stationary frame, a spindle rotatably mounted on said frame, an index plate rigidly secured to said spindle, a swinging member mounted for oscillation about the axis of said spindle, a shaft journaled in said frame, means for rotating said shaft, a crank pin carried by said shaft and adjustable to different distances from the axis of said shaft, a slide movable on said frame in a fixed direction at right angles to the axis of said shaft and having a straight, transverse slot therein in which said crank pin is engaged so that said crank pin may drive said slide as the shaft rotates, an operative connection between said slide and said swinging member for oscillating said swinging member upon rotation of said shaft, a first dog carried by said swinging member for movement into and out of engagement with said index plate to intermittently connect and disconnect said swinging member and said index plate, said first dog contacting said index plate along opposite side surfaces of the dog to hold said plate against movement relative to said swinging member in both directions when said first dog is engaged with said index plate, a part carried by said frame, a second dog carried by said part for intermittently connecting said part and said index plate so that said index plate is alternately connected to said part and to said swinging member, means for controlling the movement of said second dog into and out of engagement with said index plate, and rotating means for controlling the movement of said first dog into and out of engagement with said index plate.

3. An indexing mechanism comprising a stationary frame, a spindle rotatably mounted on said frame, an index plate rigidly secured to said spindle and having a plurality of notches around its circumference, a swinging member mounted for oscillation about the axis of said spindle, a shaft journaled in said frame, means for rotating said shaft, a crank pin rigidly secured to said shaft, means operatively connecting said crank pin with said swinging member so that rotation of said shaft oscillates said swinging member, a dog movably mounted on said swinging member for intermittently engaging at the same time both sides of one of said notches to connect said swinging member and said index plate to move together, a part carried by said frame, a second dog mounted on said part for intermittently engaging one of said notches to connect said part and said index plate so that said index plate is alternately connected to said part and to said swinging member, means for controlling the movement of said second dog into and out of engagement with said index plate, and rotating means for controlling the movement of said first dog.

4. An indexing mechanism comprising a stationary frame, a spindle rotatably mounted on said frame, an index plate rigidly secured to said spindle, a swinging member mounted for oscillation about the axis of said spindle, a rotary element journaled in said frame, means for rotating said element, a crank pin secured to said element to be adjusted relative thereto to different distances from the axis of said element, means operatively connecting said crank pin with said swinging member so that rotation of said element oscillates said swinging member, a first dog carried by said swinging member for intermittently connecting said swinging member and said index plate, a part carried by said frame, a second dog mounted on said part for intermittently connecting said part with said index plate so that said index plate is alternately connected to said part and to said swinging member, and cam means for moving said dogs to and from locking position, said cam means comprising two cam members mounted for rotation on the axis of said index plate, and means for effecting different rotation of said cam members.

5. An indexing mechanism comprising a stationary frame, a spindle rotatably mounted on said frame, an index plate rigidly secured to said spindle, a swinging member mounted for oscillation about the axis of said spindle, a rotary element journaled in said frame, means for rotating said element, a crank pin secured to said element to be adjusted relative thereto to different distances from the axis of said element, means operatively connecting said crank pin with said swinging member so that rotation of said element oscillates said swinging member, a first dog carried by said swinging member for intermittently connecting said swinging member and said index plate, said first dog having opposite side surfaces which contact said index plate when said first dog connects said swinging member to said index plate, thereby to hold said plate against movement in either direction relative to said swinging member, a part carried by said frame, a second dog mounted on said part for intermittently connecting said part with said index plate so that said index plate is alternately connected to said part and to said swinging member, and means separatae from said element and from the operative connection between said element and said swinging member for moving said dogs to and from locking position.

6. An indexing mechanism comprising a stationary frame, a spindle rotatably mounted on said frame, an index plate rigidly secured to said spindle, a swinging member mounted for oscillation about the axis of said spindle, a rotary element journaled in said frame, means for rotating said element, a crank pin secured to said element to be adjusted relative thereto to different distances from the axis of said element, means operatively connecting said crank pin with said swinging member so that rotation of said element oscillates said swinging member, a first dog carried by said swinging member for intermittently connecting said swinging member and said index plate, said first dog having opposite surfaces which contact said index plate simultaneously, when said first dog connects said swinging member to said plate, to hold said plate against movement in both directions relative to said swinging member, a part carried by said frame, a second dog mounted on said part for intermittently connecting said part with said index plate so that said index plate is alternately connected to said part and to said swinging member, and cam means controlling the movements of said dogs to and from locking position.

7. An indexing mechanism comprising a frame, a spindle rotatably mounted on said frame, an index plate rigidly secured to said spindle, a swinging member mounted for oscillation about the axis of said spindle, a rotary element, means for rotating said element, a crank pin secured to said element and adjustable relative thereto to different distances from the axis of said element, a slide movable in a fixed direction on said frame at right angles to the axis of said element and at right angles to the axis of said spindle, operative connections between said crank pin and said slide and between said slide and said swinging member so that said swinging member is oscillated upon rotation of said element, a first dog movably mounted on said swinging member for intermittently connecting said swinging member and said index plate, said first dog having opposite surfaces which contact said index plate simultaneously when said first dog connects said swinging member to said index plate to hold said plate against movement relative to said swinging member in both directions, a part mounted on said frame, a second dog carried by said part for intermittently connecting said part with said index plate so that said index plate is alternately connected to said part and to said swinging member, and cam means comprising two cooperating cam members for controlling the movements of said connecting dogs to and from locking positions.

8. An indexing mechanism comprising a frame, a spindle rotatably mounted on said frame, an index plate rigidly secured to said spindle, a swinging member mounted for oscillation about the axis of said spindle, a rotary element, means for rotating said element, a crank pin secured to said element and adjustable relative thereto to different distances from the axis of said element, a slide movable at right angles to the axis of said element and in the direction of the axis of said spindle, operative connections between said crank pin and said slide and between said slide and said swinging member so that said swinging member is oscillated upon rotation of said element, a first dog carried by said swinging member for intermittently connecting said swinging member and said index plate, said first dog having opposite surfaces which contact said index plate simultaneously when said first dog connects said swinging member to said index plate, thereby to hold said plate against movement relative to said swinging member in both directions, a part mounted on said frame, a second dog carried by said part for intermittently connecting said part with said index plate so that said index plate is alternately connected to said part and to said swinging member, and cam means controlling the movements of said dogs to and from connecting positions.

9. An indexing mechanism comprising a frame, a spindle rotatably mounted on said frame, an index plate rigidly secured to said spindle, a pair of swinging members mounted to oscillate simultaneously in the same rotational direction but at different speeds about the axis of said spindle, a pair of rotary elements, means for rotating said elements, a crank pin secured to each of said elements, means operatively connecting each of said crank pins with one of said swinging members, so that upon rotation of said elements said swinging members are oscillated, dogs mounted on said swinging members for alternately connecting said swinging members with said index plate, and means separate from said index plate for controlling the movements of said dogs to and from connecting positions.

10. An indexing mechanism comprising a frame, a spindle rotatably mounted on said frame, an index plate rigidly secured to said spindle, a pair of swinging members mounted to oscillate simultaneously in the same rotational directions but at different speeds about the axis of said spindle, a pair of rotary elements rigidly connected with each other and having a common axis of rotation, means for rotating said elements, a crank pin secured to each of said elements and adjustable thereon to different distances from the axis of said elements, means operatively connecting said crank pins with said swinging members, respectively, so that upon rotation of said elements said swinging members are oscillated, a dog mounted on each of said swinging members for alternately connecting said swinging members with said index plate, and means separate from said index plate for controlling the movements of said dogs to and from connecting positions.

11. An indexing mechanism comprising a frame, a spindle rotatably mounted on said frame, an index plate rigidly secured to said spindle, a pair of swinging members mounted to oscillate simultaneously in the same rotational directions but at different speeds about the axis of said spindle, a pair of rotary elements rigidly connected with each other and having a common axis of rotation offset from the axis of said spindle and disposed at right angles thereto, means for rotating said elements, a crank pin secured to each of said elements and adjustable thereon to different distances from the axis of its element, a pair of slides movable on said frame in a fixed direction at right angles to the axis of said elements, each slide being operatively connected with one of the crank pins, said two slides being disposed on opposite sides of said spindle, means connecting each slide with one of said swinging members so that on rotation of said elements said swinging members are oscillated, dogs mounted on said swinging members for alternately connecting said swinging members with said index plate, and cam means controlling the motion of said dogs to and from connecting position.

12. An indexing mechanism comprising a frame, a spindle rotatably mounted on said frame, an index plate rigidly secured to said spindle, a rotary element journaled on said frame, means for rotating said element, means operatively connecting said element and said index plate to intermittently index said plate on rotation of said element, an oscillatory mass balance member mounted on said frame on an axis extending in the same direction as the axis of said spindle, and means operatively connecting said element and said mass balance member to oscillate said member while said spindle is being indexed and in such way that the angular acceleration of said mass-balance member is opposite to that of said index plate.

13. An indexing mechanism comprising a frame, a spindle rotatably mounted on said frame, an index plate rigidly secured to said spindle, a rotary element journaled on said frame, means for rotating said element, means operatively connecting said element and said index plate to intermittently index said plate on rotation of said element, an oscillatory mass balance member mounted on said frame on an axis parallel to the axis of said spindle, means operatively connecting said element and said mass balance member to oscillate said member while said spindle is being indexed and in such way that the angular acceleration of said mass-balance member is opposite to that of said index plate, an inertia member, and varying ratio gearing connecting said inertia member to said rotary element to supply varying kinetic energy to the moving parts and to receive it back from them for storage.

14. An indexing mechanism comprising a stationary frame, a spindle rotatably mounted thereon, an index plate rigidly secured to said spindle, a swinging member mounted for oscillation about the axis of said spindle, a crank plate rotatably mounted on said frame, means for driving said crank plate, means operatively connecting said crank plate to said swinging member so that said swinging member oscillates as the crank plate rotates, a first dog for intermittently connecting said swinging member and said index plate to move together, a part carried by said frame, a second dog mounted on said part for intermittently connecting said part and said index plate so that said index plate is alternately connected to said part and to said swinging member, means comprising a pair of cams for controlling, respectively, the connection and disconnection of said dogs, means for driving the cam which controls said second dog at a uniform velocity, and means for driving at least one of said cams at a varying velocity.

15. An indexing mechanism comprising a stationary frame, a spindle rotatably mounted thereon, an index plate rigidly secured to said spindle, a swinging member mounted for oscillation about the axis of said spindle, a crank plate rotatably mounted on said frame, means for driving said crank plate, means operatively connecting said crank plate to said swinging member so that said swinging member oscillates as the crank plate rotates, a first dog for intermittently connecting said swinging member and said index plate to move together, a part carried by said frame, a second dog mounted on said part for intermittently connecting said part and said index plate so that said index plate is alternately connected to said part and to said swinging member and means comprising a pair of cams for controlling, respectively, the connection and disconnection of said dogs, means for driving the cam which controls said second dog at a uniform velocity, and means comprising a differential for driving the other cam at a varying velocity, one element of said differential being connected to said one cam to be driven in time therewith at a uniform velocity, and another element of said differential being connected to said swinging member to be driven thereby at a varying velocity.

16. An indexing mechanism comprising a support, a spindle journaled in said support, an index plate rigidly secured thereto, a pair of oscillatory members, means for oscillating each of said members at a varying velocity, means for alternately connecting said members to said index plate, including a dog carried by each member and engageable with said index plate, and means for moving said dogs to and from connecting positions comprising a pair of coaxial cams, and means connected with said oscillating means for driving said cams.

17. An indexing mechanism comprising a support, a spindle journaled in said support, an index plate rigidly secured thereto, a pair of oscillatory members, means for oscillating each of said members at a varying velocity, means for alternately connecting said members to said index plate, including a dog carried by each member and engageable with said index plate, and means for moving said dogs to and from connecting positions comprising a pair of coaxial cams, and means connected with said oscillating means for driving said cams, comprising a pair of differentials, means connecting each differential to one of said cams, means for driving one element of each differential at a uniform velocity, and means connecting another element of each differential to said oscillatory members to be driven thereby at a varying velocity.

References Cited in the file of this patent

UNITED STATES PATENTS

| | | |
|---|---|---|
| 646,287 | Hundhausen | Mar. 12, 1900 |
| 1,135,990 | Bronander | Apr. 20, 1915 |
| 1,351,200 | Bullock et al. | Aug. 31, 1920 |
| 1,425,082 | Eklund | Aug. 8, 1922 |
| 1,470,565 | Hall | Oct. 9, 1923 |
| 1,577,460 | Franca | Mar. 23, 1926 |
| 1,710,865 | De Leeuw | Apr. 30, 1929 |
| 1,716,548 | Habrie | June 11, 1929 |
| 1,745,460 | Sudhoff | Feb. 8, 1930 |
| 1,812,460 | Wellton | June 30, 1931 |
| 2,392,964 | Armitage et al. | Jan. 15, 1946 |
| 2,543,370 | Klud et al. | Feb. 7, 1951 |
| 2,652,247 | Kane | Sept. 15, 1953 |
| 2,699,337 | Best | Jan. 11, 1955 |
| 2,825,426 | Baxter | Mar. 4, 1958 |